Dec. 10, 1968  K. H. MINDRUM  3,415,161
PISTON STROKE LIMIT MEANS
Filed Dec. 12, 1966
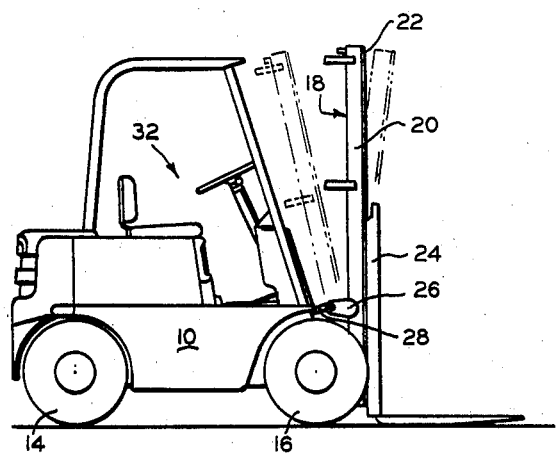
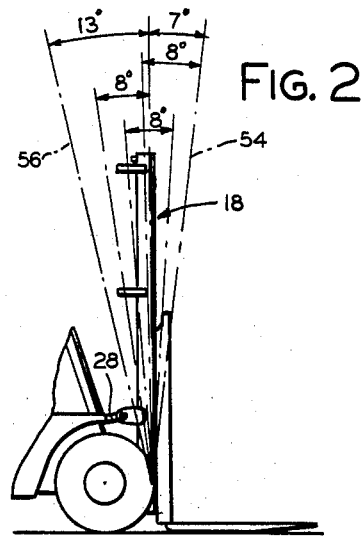
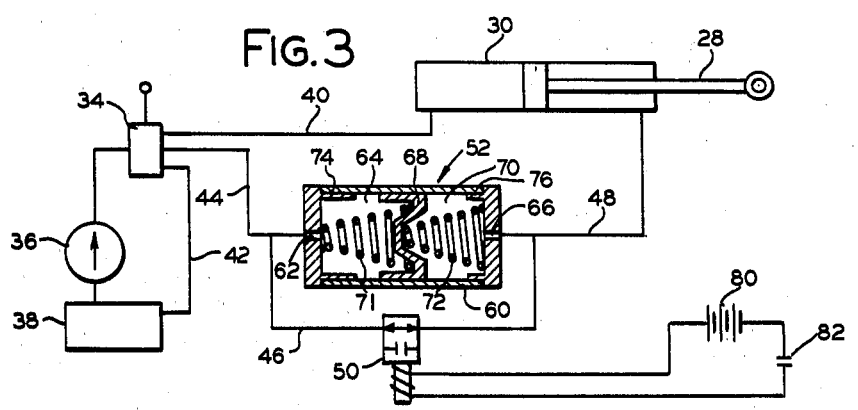
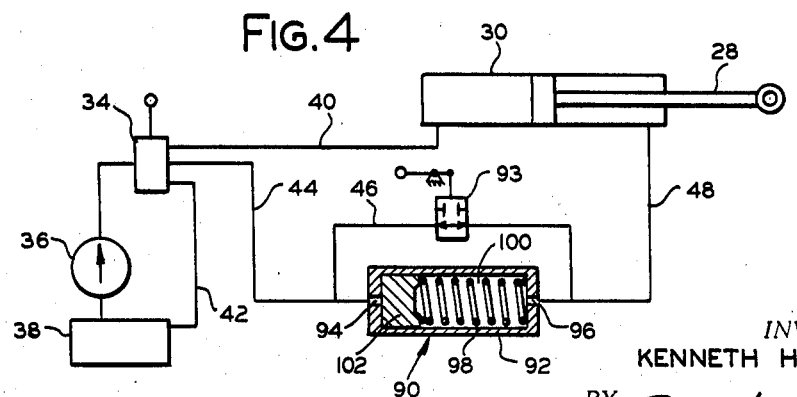
INVENTOR
KENNETH H. MINDRUM
BY
ATTORNEY United States Patent Office 3,415,161
Patented Dec. 10, 1968

3,415,161
PISTON STROKE LIMIT MEANS
Kenneth H. Mindrum, Battle Creek, Mich., assignor to
Clark Equipment Company, a corporation of Michigan
Filed Dec. 12, 1966, Ser. No. 601,054
13 Claims. (Cl. 91—19)

ABSTRACT OF THE DISCLOSURE

An adjustable hydraulic stroke limit device for variably controlling the amount of piston movement in a hydraulic cylinder assembly in which a flow control valve is selectively in series flow relation with both ends of the cylinder, a second valve is in series with said control valve and with one end of said cylinder and in parallel flow relation with a piston stroke limiting device which limits the stroke of the piston in one position of said second valve and which is inoperative to limit said stroke in a second position of the second valve.

The invention is capable of many and varied applications wherever a limited piston stroke less than the stroke limit which is imposed inherently by the length of a fluid pressure operated cylinder is desired. For purposes of illustration, the exemplary embodiments described hereinbelow will be related to an application of the invention wherein it is adapted to limit and vary selectively the tilting range of industrial lift truck mast assemblies.

As is well understood in the industrial truck industry, lift truck stability is divisible into longitudinal and lateral stability. Fixed factors which affect longitudinal stability are wheel base and weight distribution of the vehicle. Variable, and controllable, factors which affect longitudinal stability are the weight and distribution of weight on the fork, the elevation of the load on the fork, and the degree of forward and rearward tilt of the upright or mast assembly. For example, increasing the load or the distance of the center of gravity of the load from the front axle, or increasing the elevation of the load on the upright or the forward tilt of the upright, or increasing the slope along which a truck travels, will all effect, to a greater or lesser degree, a decrease in longitudinal stability.

Fixed factors which affect lateral stability are the tread of the wheels and weight distribution of the vehicle. Variable, and controllable factors, which affect lateral stability are load elevation, load distribution on the fork, the degree and direction of tilt of the upright, and/or the slope across which a truck may be traveling. As to the variable factors, back tilt of the upright, for example, will effect a decrease in lateral stability of trucks of a certain design while increasing the longitudinal stability, and forward tilt of the upright will have an opposite effect. Again, increasing the elevation of any given load on the upright with the upright in a vertical and non-tilted position will effect a decrease in both lateral and longitudinal stability.

Having given any set of values of the variable factors in a machine of particular design, the resultant stability of a vehicle, both lateral and longitudinal, can be calculated. However, in the actual use of lift trucks, operators sometime overload, overlift, and/or overtilt a load without considering the possible consequences.

I have devised an extremely novel construction of great simplicity by means of which certain factors which affect the longitudinal and lateral stability of lift trucks are readily controlled by an operator within acceptable limits of safety so as to minimize the possibility of truck operation in an unsafe manner in respect of various possible combinations of load, elevation and tilt.

It is an important object of the present invention to provide an improved piston stroke limiting device for hydraulic cylinder assemblies.

It is another important object of the invention to provide an improved device operable selectively to limit the stroke of hydraulic pistons.

It is another object of the invention to provide improved stroke limiting means for the tilt cylinders of lift truck upright assemblies.

Another object of the invention is to provide either manually or automatically selectable limited tilt ranges for various modes of operation of lift truck uprights.

Other objects, features, and advantages of the present invention will readily appear to persons skilled in the art from the following detailed description taken in conjunction with the drawings wherein:

FIGURE 1 is a side elevational view of an industrial lift truck with which the present invention is adapted to be used;

FIGURE 2 is a partial elevational view of the forward portion of the truck shown in FIG. 1, illustrating various exemplary limited tilt ranges of the lift truck upright selectable under different operating conditions by an operator, all within the maximum upright tilt range available;

FIGURE 3 is a schematic illustration of one embodiment of my invention in a hydraulic system which is suitable for use with the lift truck shown in FIG. 1; and FIGURE 4 is a schematic view of another embodiment of the invention also suitable for the above stated use.

Referring now to the figures in detail, the industrial lift truck shown generally in FIG. 1 comprises a body and frame structure 10 supported from a pair of rear steer wheels 14 and a pair of front drive wheels 16 having mounted for pivotal movement on the axle housing of wheels 16 a telescoping mast mechanism 18 having a pair of fixed outer upright channel members 20, a pair of inner telescoping roller mounted I-beam members 22 which are nested in channels 20 in overlapping relation, a hoist motor assembly, not shown, mounted in the base of the upright and having chain and sprocket mechanism conventionally associated herewith and connected at one end to a fork carriage device 24 which is adapted to be elevated in the upright by the hoist motor assembly. A detailed description of a suitable upright mechanism of the type generally described above appears in Patent No. 3,213,967.

Connected to the outer side portion of each channel member 20 is a bracket 26 to which is pivotally connected the end of a piston rod 28 of a double-acting tilt cylinder assembly 30 which is adapted to be pivotally connected at its base end to a portion of the truck frame, not shown. Cylinder assemblies 30 are adapted to actuate mast 18 in a tilting movement fore or aft of a vertical position of the mast, as shown in broken lines in FIG. 1. The various controls required for operating the truck are located in operator's compartment 32, including a selector valve 34 for controlling the tilting operation of mast 18.

Referring now to FIG. 2, the selector valve 34 is connected to a hydraulic fluid supply pump 36 which is adapted to pump pressure fluid thereto from a reservoir 38. Valve 34 may be a conventional spool-type valve, the various ports of which are connected to the base end of cylinder 30 by a conduit 40, to the reservoir 38 by a bypass conduit 42, and to the rod end of cylinder 30 by conduits 44, 46 and 48, either through a valve means 50 or a stroke limiting cylinder assembly 52. Valve means 50 may be a simple open or shut valve, controlled either manually or automatically under various operating conditions. When the valve is open hydraulic fluid can flow through it unrestrictedly in either direction, bypassing the stroke limit device 52 and permitting the operator to pressurize the base end of cylinder 30 by manipulation of valve 34 to direct pressure fluid through conduit 40 and extend piston rod 28 a selected amount within the maximum available extension of the piston rod as limited only by the length and construction of cylinder 30. Conversely, piston rod 28 may be retracted by directing pressure fluid through conduits 44, 46 and 48 by way of valve 50 to the rod end of cylinder 30, in which case the piston rod can be retracted fully within cylinder 30 as limited only by the length and construction of the cylinder.

In the exemplary application of my device to the lift truck of FIG. 1, maximum forward and rearward tilt positions of upright assembly 18 are illustrated in the broken line positions of the upright. In FIG. 2 maximum forward tilt is illustrated by line 54, and maximum rearward tilt by line 56. In other words, so long as valve 50 remains open the operator can select any upright tilt angle, forwardly or rearwardly, within the limitation imposed by the exemplary angle between lines 54 and 56, and irrespective of upright elevation or load.

Limit device 52 comprises a hydraulic cylinder 60 having a port 62 in the one end communicating conduit 44 with a chamber 64, and a port 66 in the opposite end communicating conduit 48 with a chamber 70, said chambers being formed between the respective cylinder ends and a piston 68 which is normally located in a centered position in the cylinder by the action of coil springs 71 and 72 in chambers 64 and 70, respectively. An annular cylinder stop 74 is connected to the one end cover of the cylinder, and an annular cylinder stop 76 is connected to the opposite end. Piston 68 has a maximum travel range limited by available movement thereof between positions of abutment with stops 74 and 76. So long as valve 50 remains open it will be apparent that piston 68 remains centered in cylinder 60, since fluid pressure is vented to both of chambers 64 and 70 whether piston rod 28 is actuated in extension or retraction.

Actuation of valve 50 to a closed position interrupts communication between conduits 44 and 48 by way of conduit 46, and any flow in conduit 44 or 48 must be by way of limit device 52. If, for example, the operator actuates valve 34 with valve 50 closed to effect retraction of piston rod 28, pressure fluid from pump 36 is directed to chamber 64 which actuates piston 68 a selected distance between its center position and stop 76 thereby transferring fluid under pressure from chamber 70 through conduit 48 to the piston rod end of cylinder 30 and retracting rod 28, which exhausts fluid from the base end of cylinder 30 through conduit 40, valve 34 and conduit 42 to reservoir 38. On the other hand, if the operator desires to extend piston rod 28, valve 34 is actuated to direct pressure fluid to the base end of cylinder 30 by way of conduit 40, which exhausts fluid from the rod end through conduit 48 to chamber 70, actuating piston 68 a selected distance towards stop 74 which exhausts fluid from chamber 64 to reservoir 38 by way of conduits 44 and 42, and valve 34.

As illustrated in FIG. 2, the maximum total range of tilt of upright 18 with valve 50 open is 20°, i.e., 7° forwardly and 13° rearwardly of a vertical position. With valve 50 closed the maximum total range of tilt is illustrated as 8°, which represents the effective movement of piston 68 from one of stops 74 and 76 to the other of said stops. Although the range of tilt controlled by limit device 52 is a fixed and limited amount within the total range possible between forward tilt position 54 and rearward tilt position 56, the 8° range illustrated is selectable with infinite variation between said possible total range. In other words, the position of the upright when valve 50 is closed initially determines the centered position of said upright from which it is capable of being actuated 3° forwardly and 5° rearwardly, for example, by the operation of tilt limit device 52, as aforesaid illustrated in FIG. 2 are three representative limited tilt ranges controlled by device 52.

Valve 50 is represented in FIG. 3 as a normally open solenoid valve connected to a battery 80. A normally open switch 82 is adapted to be closed at a predetermined elevation of the upright, thereby energizing the solenoid valve to a closed position. Closing of switch 82 may be readily accomplished, for example, by means of a simple actuator element mounted on fork carriage 24 and adapted to close the switch, which may be connected to one of the upright channel members 20, when the fork carriage reaches a predetermined elevation. Alternatively, it may be found preferable to arrange valve 50 for manual actuation by the operator, which enables greater selectivity of thos conditions under which tilt limit control shall be effected. A manually controlled valve is shown at 93 in FIG. 4, to be described. Also, of course, a valve 50 may be adapted for combination solenoid and manual operation to maximize selectivity of tilt ranges by the operator, while having an override switch control on the solenoid element, as in FIG. 3, at a predetermined level of elevation of the fork carriage 24.

A preferred embodiment of the invention is illustrated in FIG. 4. The same numerals are used in FIG. 4 as in FIG. 3, insofar as they apply to similar elements. The hydraulic system of FIG. 4 may be the same as in FIG. 3, except for the construction of the tilt limit device, which is shown generally at numeral 90.

Limit device 90 comprises a cylinder 92 having ports 94 and 96 at the opposite ends thereof communicating with conduits 44 and 48, respectively, and a spring 98 in chamber 100 normally maintaining a piston 102 in a fully actuated position at one end of the cylinder. As in the operation of the embodiment of FIG. 3, so long as manual valve 93 is open limit device 90 is ineffective, and the piston rod 28 can be actuated without restriction to its forward and rearward maximum tilt positions as defined in FIG. 2 by lines 54 and 56. Under any selected condition of operation, the operator may close valve 93, in which event device 90 becomes effective to limit the available range of tilt of upright 18, as described above in respect of FIGS. 2 and 3. However, in the embodiment of FIG. 4 the maximum forward tilt position of the upright is determined at the time valve 93 is closed, since piston 102 is always located at the one end of cylinder 92 under such conditions. That is to say, with piston 102 located at the extreme left end of cylinder 92, piston rod 28 cannot be further extended with valve 93 closed, since fluid from the rod end of cylinder 30 cannot actuate piston 102 further leftwardly. The total range of tilt of upright 18 under such conditions is, therefore, always rearwardly of such a selected maximum forward tilt position. It will be apparent that such rearward tilting of the upright is effected by manipulation of valve 34 to direct pressure fluid through conduit 44 and port 94 which actuates piston 102 against spring 98 a selected distance within the 8° degree range as illustrated in FIG. 2, during which actuation pressure fluid is exhausted from chamber 100 through port 96 and conduit 48 to retract piston rod 28 and exhaust fluid from the base end of cylinder 30 to reservoir 38 by way of conduits 40 and 42, and valve 34. Again, as in FIG. 3, valve 93 can be controlled electrically alternately or in combination with a manual control, or by any other suitable automatic control means.

Either of limit devices 52 or 90 may be rephased by opening valve 50 or 93, whereupon pistons 68 and 102 are returned to the positions illustrated in FIGS. 3 and 4, respectively. Then, any other limited stroke range of piston rod 28 can be selected within the total available stroke engine of cylinder 30.

It will now be apparent to persons skilled in the art that I provided an extremely simple and low cost device which is selective to a maximum degree in its control of ranges of movement of piston rod 28 within the total available movement of the piston in cylinder 30. The exemplary application described above in respect of lift truck upright tilt control is intended to be merely representative of one use of the invention. It is applicable wherever a limited stroke piston operation is desired.

It will be apparent to persons skilled in the art that variations in the construction and arrangement of parts are available within the scope of the invention. For instance, as illustrated in FIGS. 3 and 4, the limit device and bypass valve associated therewith will operate as well in conduit 40 as in the conduits with which it communicates in the illustrations. Any desired limitation may be placed on the stroke of piston rod 28, depending on the design of limit device 52. Obviously, a variable limit may be imposed by rendering stop means 74 and 76 in FIG. 3, for example, adjustable, or by inserting adjustable stop means at the opposite ends of limit device 90. Of course, bypass valves 50 and 93 may be controlled on the basis of any selected parameter, depending upon the application of the invention. For illustrative purposes only, I have shown both manual and electrical control of these valves. Also, for example, valve 50 could be mounted in slidable relation to piston rod 28, hydraulically bypassing the limit device as described, so that at a predetermined degree of extension of piston rod 28 a switch 82, for example, would be closed to energize the solenoid valve to a closed position, from which point of extension of piston rod 28 the limit device would be effective to control retraction and further extension in the case of limit device 52, and retraction only in the case of limit device 90. My invention is also applicable to a single acting cylinder under load, as, for example, a lift cylinder for lift truck uprights. Basically, my invention is directed to an improved limited stroke piston construction with an override feature. An important feature, I believe, resides in the simplicity and low cost construction of the invention, while effecting an improved function in an essentially foolproof manner.

Although only two embodiments of my invention have been described specifically herein, this disclosure is merely for purposes of illustration and not as a limitation of the scope of the invention. It is therefore to be expressly understood that the invention is not limited to the specific embodiments shown, but may be used in various other ways, and that various modifications may be made to suit different requirements, and that other changes, substitutions, additions and omissions may be made in the construction, arrangement and manner of operation of the parts without necessarily departing from the scope of the invention as defined in the following claims.

I claim:

1. In a hydraulic system having an extensible cylinder and piston device and a first valve means directing pressure fluid to the cylinder to extend the piston, means for limiting the piston stroke comprising a movable fluid pressure responsive means operatively connected to said cylinder, second valve means bypassing said pressure responsive means and operatively corrected to said cylinder, said first valve means being in series fluid flow relation with said pressure responsive means and with said second valve means, said second valve means having a selected first position in which said pressure responsive means is inoperative to limit the stroke of the piston and a selected second position in which said pressure responsive means is operative to limit the stroke of the piston, and conduit means suitably connecting said cylinder and piston device with said first and second valve means and with said pressure responsive means.

2. A hydraulic system as claimed in claim 1, wherein said first position of said second valve means renders said fluid pressure responsive means inoperative.

3. A hydraulic system as claimed in claim 1, wherein said second position of said second valve means renders said fluid pressure responsive means effective to exhaust at least a portion of the fluid in said latter means to one end of said cylinder for actuating said piston a distance which is a function of the movement of said fluid pressure responsive means.

4. A hydraulic system as claimed in claim 1, wherein said fluid pressure responsive means comprises a second cylinder and piston means, said second piston being rendered inoperative in said first position of said second valve means and rendered operative in said second position of said second valve means.

5. A hydraulic system as claimed in claim 4, wherein said first position of said second valve means is open and said second position thereof is closed.

6. A hydraulic system as claimed in claim 1 wherein the limited stroke of the piston is substantially fixed in length, said second position of said second valve means being initiatable at any position of said piston in said cylinder, from which latter position said limited stroke of said piston is controlled by said fluid pressure responsive means.

7. A hydraulic system as claimed in claim 1 wherein said second valve means is in parallel flow relation with said fluid pressure responsive means.

8. In a hydraulic system having a double-acting extensible first cylinder and piston device and a first valve means for directing pressure fluid to the cylinder to extend or retract the piston, means for limiting the piston stroke comprising a second cylinder and piston device operatively connected to said first cylinder and piston device, second valve means bypassing said second cylinder and piston device and communicating with said first cylinder, said first valve means being in series flow relation with said second cylinder and piston device and with said second valve means, said second piston being located in a normally inoperative position when said second valve means is in a first position, and said second piston being rendered operative to limit the stroke of said first piston by stroking the first piston as a function of a determined volume of fluid communicated thereto by movement of the second piston when said second valve means is in a second position.

9. A hydraulic system as claimed in claim 8 wherein said second valve means is normally open to permit stroking the first piston in maximum extension or retraction, closing of said second valve means effecting a limitation on the stroking of said first piston as a function of the fluid volume contained in at least a portion of said second cylinder.

10. A hydraulic system as claimed in claim 8 wherein said second piston is urged to a normally inoperative position, closing of said second valve means effecting an operative connection between said first and second pistons such that stroking of said first piston is limited by available movement of said second piston in said second cylinder.

11. A hydraulic system as claimed in claim 10 wherein the normal and operative position of said second piston is at a stop position adjacent one end of the second cylinder, said second piston being adapted to communicate the fluid in said cylinder to said first cylinder in a first direction of first piston movement and to receive fluid from said first cylinder in a second direction of movement of said first piston.

12. A hydraulic system as claimed in claim 8 for controlling the operation of a lift truck having a tiltable upright wherein said first cylinder and piston device comprises a tilt cylinder device connected to the upright, said second cylinder and piston device controlling a limited range of upright tilt by limiting the stroke of said first piston to a stroke less than is normally available, the range of tilt controlled by said second piston being adjustable within the maximum range of movement of said first piston as a function of the position of the upright at the time said second valve means is moved to said second position.

13. A hydraulic system as claimed in claim 8 wherein said second valve means is in parallel flow relation with said second cylinder and piston device.

References Cited

UNITED STATES PATENTS

| 2,613,703 | 10/1952 | Calvert | 91—32 X |
| 3,007,593 | 11/1961 | Hancock | 214—674 |
| 3,055,346 | 9/1962 | Hardesty et al. | 91—417 X |

OTHER REFERENCES

I.B.M. Technical Disclosure, Digital Hydraulic Actuators, by J. W. Raider, vol. 8, No. 1, June 1965, pp. 89–91.

CARROLL B. DORITY, JR., *Primary Examiner.*

U.S. Cl. X.R.

91—032; 214—674, 673

UNITED STATES PATENT OFFICE
CERTIFICATE OF CORRECTION

Patent No. 3,415,161                                December 10, 196

Kenneth H. Mindrum

It is certified that error appears in the above identified patent and that said Letters Patent are hereby corrected as shown below:

Column 4, line 15, "thos" should read -- those --; line 70, "engine" should read -- range --. Column 5, line 57, "corrected" should read -- connected --.

Signed and sealed this 10th day of March 1970.

(SEAL)
Attest:

Edward M. Fletcher, Jr.                          WILLIAM E. SCHUYLER, JR.
Attesting Officer                                    Commissioner of Patents